March 6, 1934. P. S. ALLEN 1,949,772
METHOD OF AND DEVICE FOR PRODUCING ORNAMENTED
BEVERAGES AND FROZEN CONFECTIONS
Filed Aug. 7, 1931
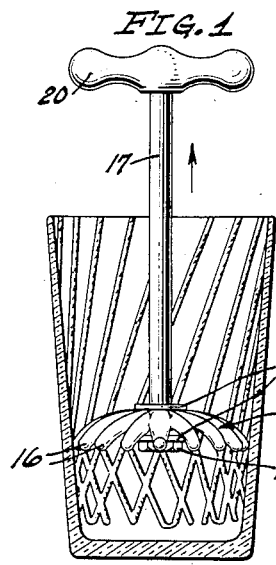
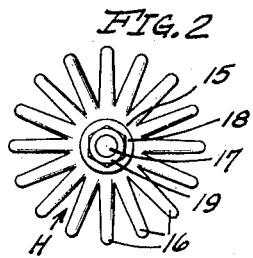
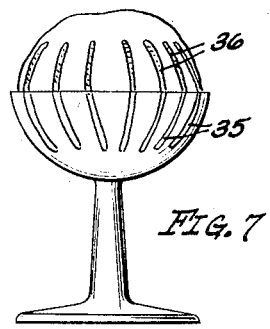
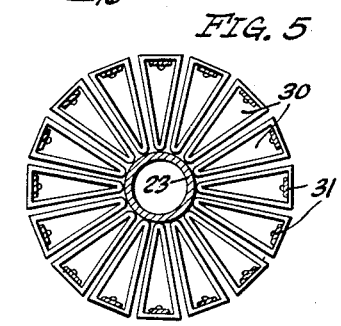
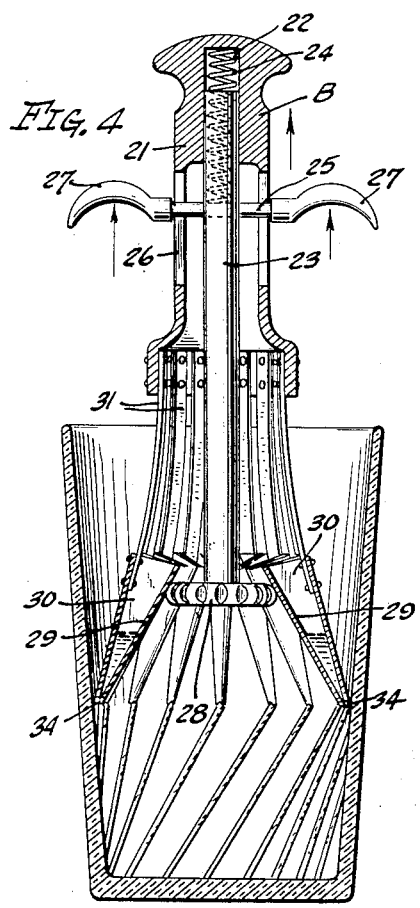
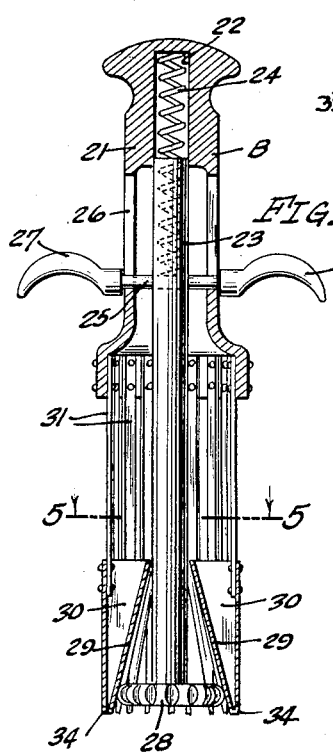
INVENTOR.
PHILIP S. ALLEN
BY
ATTORNEY Patented Mar. 6, 1934

1,949,772

UNITED STATES PATENT OFFICE 1,949,772

METHOD OF AND DEVICE FOR PRODUCING ORNAMENTED BEVERAGES AND FROZEN CONFECTIONS

Philip S. Allen, Avalon, Calif.

Application August 7, 1931, Serial No. 555,766

19 Claims. (Cl. 107—47)

My invention relates to and has for a purpose the provision of a method of and devices for producing artistically decorated beverages and frozen confections such as "sodas", "sundaes", "malted milks" and the like, to the end of greatly increasing their attractiveness to the eye, and thereby rendering them more palatable and, hence more readily salable.

I will describe only one method of and two devices for producing ornamented beverages and frozen confections, embodying my invention, and will then point out the novel features thereof in claims.

In the accompanying drawing,

Fig. 1 is a view showing in side elevation one form of device for producing ornamented beverages, embodying my invention.

Fig. 2 is a view showing the device of Fig. 1 in bottom plan.

Fig. 3 is a vertical sectional view of another form of device embodying my invention, and in retracted or inactive position.

Fig. 4 is a view similar to Fig. 3, and showing the device in expanded or active position and applied to a soda glass.

Fig. 5 is an enlarged sectional view taken on the line 5—5 of Fig. 3.

Fig. 6 is an enlarged detail perspective view of one of the cups embodied in the device shown in Figs. 3 and 4.

Fig. 7 is a view showing in side elevation an ice cream glass or dish, and one form of design which the device shown in Fig. 3 is capable of making in the glass and on the scoop of ice cream.

My invention first involves a method of producing ornamented beverages such as malted milks and sodas with or without ice cream, and also frozen confections such as ice cream "sundaes". In the performance of my method, I can employ various forms of devices by which flavoring syrups or pastes can be applied to the interior of a glass or transparent dish, the only structural prerequisite of the devices being that they have some means capable of carrying syrup or paste and discharging it in a predetermined manner onto the glass or dish so as to permit the operator of the device to form on the inner wall of the glass or dish a design of any desired configuration within the limits of the devices.

My method embodies the application of a flavoring syrup of a relatively heavy consistency or a flavoring paste such as marshmallow paste or chocolate paste, to the inner wall of a glass or dish and in such a manner as to form on the latter an artistic and colored design of any desired configuration.

By immediately following the formation of the design on the inner wall of the glass, with the introduction into the glass of the soda water and ice cream as in the instance of an ice cream soda, or the ice cream alone as in the case of an ice cream "sundae", and substantially centrally of the glass, the design is preserved on the inner wall of the glass against obliteration, so that when the completed beverage is served, the design in its contrasting color is clearly discernible through the wall of the glass. Thus is produced an artistically ornamented beverage or frozen confection which is both attractive and palatable.

By means of the devices herein illustrated and described, one is enabled to produce a beverage or frozen confection which in the glassed form, is ornamented by streaks of syrup or paste to form various striated effects, although it is to be understood that other devices may be employed to produce other designs, without departing from the method involved in my invention.

The form of device shown in Figs. 1 and 2 comprises a head H having a central part 15 from which radiate a multiplicity of fingers 16, the head having the general form of a daisy. The head is formed of rubber or any other material having the requisite flexibility to permit the fingers to be flexed laterally to one side or the other of the central part in order to present one side of the finger ends or the other to the inner wall of a beverage glass.

The central part 15 is formed with an opening through which extends the reduced end of a rod 17 provided with washers 18 at opposite sides of the head, and a nut 19 threaded on the rod to confine the head against displacement from the rod.

The upper end of the rod is provided with a handle 20 which is manually gripped to manipulate the device in the formation of an ornamented beverage or frozen confection.

One mode of use of the device to perform my method is to submerge the head H in the flavoring syrup or paste so as to completely coat the head. The head as coated is extended into the glass as illustrated in Fig. 1, so that the tips of the fingers have wiping contact with the inner wall of the glass. As the head is moved downward, the fingers are flexed upward, the flexure increasing as the head descends when using tapered glasses. In consequence of the finger tips wiping the glass, the syrup or paste is deposited on the wall of the glass and from the bottom sides of the fingers so as to form streaks, lines, or beads having the color of the syrup or paste. In this particular form of device, it is necessary to rotate the head as it is moved downward into the glass and to continue such rotation in the same direction as it is moved upward out of the glass, otherwise the streaks or lines will be smeared and a clear design cannot be formed.

By manipulating the device in this manner, spiral lines extending in one direction are formed during downward movement of the head H, other spiral lines extending in the opposite direction and intersecting the former are formed as the head is moved upward. In Fig. 1, I have shown the head as having moved down to the bottom of the glass and substantially half way upward, and it will be understood that as the head is moved upward the fingers are flexed downward to cause the syrup or paste on the bottom of the fingers to be transferred to the wall of the glass. By coating the top of the head with syrup or paste of one color and the bottom with syrup or paste of another color, streaks of two different colors can be formed on the inner wall of the glass to produce a highly artistic design.

Now that the desired design has been formed on the interior of the glass, the other ingredients necessary to form the malted milk or the complete soda, plain or with ice cream, are now added, reasonable care being exercised to introduce the ingredients centrally of the glass so as not to obliterate the design, although it will be understood that the design does not retain its original definition but nevertheless, it is sufficiently clear to be readily discernible through the glass. In point of fact, the lines of the design appears slightly befogged and irregular but their value artistically is not lessened but enhanced.

Referring now to Figs. 3 and 4, I have here shown another form of device for performing my method, which is capable of being manipulated to form artistic designs on the interior of soda glasses and transparent ice cream dishes, as well as on the ice cream itself as in "sundaes".

This device comprises a tubular body B provided at its upper end with a head 21 rounded at the top and bored to form a recess 22 in which the upper end of a tubular rod 23 is slidably received. A spring 24 is disposed in the recess 22 so as to extend into the rod and abut a cross pin 25. Thus the spring serves to urge the rod downward to the position shown in Fig. 3, wherein the cross pin 25 abuts the lower ends of slots 26 in the body B. Handles 27 are secured to the ends of the pin beyond the body B, and these handles are adapted to be gripped with the fingers while the palm of the hand engages the head 21, this being the position of the hand on the device when actuating it.

An expander head 28 is fixed to the lower end of the rod 23 to engage the inclined cam faces 29 of an annular series of funnel-shaped cups 30, and when the cups are moved downward or the head upward, the head rides on the cam faces to swing all of the cups from the contracted position shown in Fig. 3 to the expanded position shown in Fig. 4. The cups are urged to the contracted position by means of springs 31 in the form of steel strips riveted or otherwise secured to the cups and to the lower enlarged end of the body B.

These springs are relatively long and, hence, liable to twist and move the cups out of their radial position. To prevent this I flute the periphery of the head 28 to receive the inner edges of the cups in a manner to hold the cups against any turning movement irrespective of their positions vertically.

As best illustrated in Fig. 6, each cup is of triangular form in cross section and tapered substantially to a point at its lower end by inclining the inner wall only. The top of the cup is open to permit filling with syrup or paste, and the lower end is constructed to allow the liquid to flow out of the cup into direct contact with the wall of a glass to be deposited thereon in the decoration of the glass.

The lower end of the outer vertical wall of the cup is cut back to form a concave edge 32, and the lower end of the inner inclined wall is similarly cut to form a concave edge 33. These edges 32 and 33 are disposed one above the other to form an intervening outlet or port 34 through which the syrup or paste is discharged laterally against the wall of a glass. By reason of the contour of the outlet, the syrup or paste is emitted so as to form on the wall of the glass, a clean and clearly defined bead or ribbon. This is true whether the cup is being moved upward or downward in the glass. In the use of the device, the cups normally occupy a contracted position under the action of the springs 31, so that they define a circle of relatively small diameter to permit them to be inserted into a glass without contacting with the wall of the glass. In actual practice the device while in contracted form, is dipped into a quantity of syrup or paste to fill the cups 30 and, hence, each cup is now provided with a supply of syrup or paste to be transferred to the glass.

Following this operation, the cups are extended into a clean and dry soda glass until they are adjacent the bottom of the glass. With the device gripped as previously described, an upward pull on the handles 27 moves the head 28 upward along the inclined faces 29 thereby camming the cups outward to the expanded position shown in Fig. 4 to bring their outlet ends into contact with the wall of the glass.

Due to the vertical position of the device, the liquid from the cups will now drain out of the ports into direct contact with the wall of the glass. By now moving the entire device slowly upward or the glass downward, and yet maintaining the cups in expanded position, streaks, lines or beads of the colored syrup are formed on the glass. If the device is drawn straight upward, vertical lines will be formed, but if the device is turned as it is withdrawn, spiral lines will be formed, as has been illustrated in Fig. 4. Further, by moving the cups to expanded position concurrently with their entrance into a glass, and turning the device as it moves downward, spiral lines of the liquid will be formed on the glass, and if the device is turned in the same direction as it is withdrawn, other lines will be made but spiraled opposite to the first lines to produce a double spiral.

It will be appreciated that the device can be manipulated in other ways to form other designs than those described. However, irrespective of the precise design, once it is formed, the malted milk is poured into the glass or the other ingredients necessary to a complete soda with or without ice cream are now added and either in such a manner that the design formed by the lines of syrup or paste is not obliterated and can be clearly seen through the glass when served to the customer.

In Fig. 7, I have shown a transparent dish in which an ice cream "sundae" is usually served. This dish can be decorated interiorly with a colored syrup or paste by proper manipulation of the device shown in Figs. 3 and 4 and, in the present instance, I show it decorated with spiral lines 35. Such ornamentation is done prior to introducing the scoop of ice cream, so that the cream when introduced tends to maintain the lines against spreading and obliterating the design. If desired the cream itself can be decorated with syrup or paste of a contrasting color. This is done with the same device by spreading the cups so that they can pass over the ice cream, and then permitting the cups to return to contracted position while moving the device upward.

The cup ends can be caused to contact with the cream to form grooves in the latter into which the syrup or paste is deposited to form colored lines 36 on the cream which may be straight or spiral as desired. In this manner the confection is decorated interiorly and exteriorly in respect to the dish.

Although I have herein shown and described only one method of and two devices for producing ornamented beverages and frozen confections, each embodying my invention, it is to be understood that various changes and modifications may be made herein without departing from the spirit of the invention and the spirit and scope of the appended claims.

I claim:

1. A method of producing ornamented beverages and frozen confections, which comprises applying one or more flavoring syrups of a like or unlike color to a transparent tumbler or dish so as to form designs of the syrup or paste on the inner wall of the tumbler or dish, and then introducing the other ingredients necessary to make a complete beverage or confection into the tumbler or dish so that the design produced by the syrup is not obliterated and can be seen through the tumbler or dish.

2. A method of producing ornamented beverages, which comprises the application of a colored flavoring syrup or paste to the interior of a glass so as to produce designs thereon, and then introducing the other ingredients to make a complete beverage.

3. A method of producing ornamented dished or glassed frozen confections, which comprises the application of a colored flavoring syrup or paste to the inner side wall of a glass or transparent dish, so as to form a design thereon, and then introducing the frozen confection into the glass or dish.

4. A method of producing ornamented "sundaes", which comprises the application of a colored flavoring syrup or paste to the inner side wall of a glass or transparent dish so as to form a design thereon, introducing the ice cream into the glass or dish, and finally grooving the ice cream and simultaneously applying in the grooves a flavoring syrup or paste of a contrasting color in respect to the ice cream.

5. A method of producing ornamented beverages, which comprises the insertion into a glass of at least one element carrying a supply of colored flavoring syrup or paste and so that the element has wiping contact with the inner wall of the glass to deposit the syrup or paste thereon, and then withdrawing the element from the glass while maintaining it in wiping contact with the glass so that other syrup or paste is deposited on the glass to coact with the first syrup to form a design on the inner wall of the glass.

6. A method of producing ornamented beverages and frozen confections, which comprises the insertion into a glass of a plurality annularly arranged elements carrying a supply of flavoring syrup or paste and normally contracted to a diameter to permit insertion without contacting the wall of the glass, expanding the elements into contact with the glass wall, and then withdrawing the elements from the glass, whereby syrup or paste is deposited on the glass wall to form a design thereon.

7. A device of the character described, comprising a body, a plurality of syrup-holding cups secured, arranged in an annular series and having outlets for discharging syrup therefrom, a plurality of spring strips secured to the body and to the cups and acting to urge the cups to a contracted position to define a relatively small circle, and means movable on the body and engaging the cups for moving the latter to an expanded position to define a relatively large circle and against the tension of said strips.

8. A device of the character described, comprising a body, a plurality of syrup-holding cups arranged in an annular series and having inclined faces, outlets in the lower ends of the cups for discharging syrup therefrom, a plurality of spring strips secured to the body and to the cups for urging the cups to a contracted position for defining a relatively small circle, and means movable on the body and engaging the inclined faces of the cups for moving the cups to an expanded position for defining a relatively large circle and against the tension of said strips.

9. A device of the character described, comprising a body, a plurality of syrup-holding cups arranged in an annular series and having inclined faces, outlets in the lower ends of the cups for discharging syrup therefrom, a plurality of spring strips secured to the body and to the cups for urging the cups to a contracted position for defining a relatively small circle, a rod movable in the body and provided with an expander head engaging said inclined faces, a spring for urging the rod lengthwise in one direction to permit the cups to occupy a contracted position, and manually operable means for moving the rod against the action of said spring for causing the expander head to move along said faces and thus move the cups to expanded position.

10. A device of the character described comprising a body having a recess and slots therein, a tubular rod movable in said recess, a spring in the rod and recess for urging the rod outward from the recess, a pin secured to the rod and movable in the slots, handles secured to the pin, a head on the rod, springs secured to the body, cups secured to the springs and having cam surfaces, said cam surfaces being engaged by said head so that when the rod is moved against the tension of said spring, the head will move along the cam surfaces to expand the cups outward against the tension of said springs.

11. A device for applying syrup or pastes to the inner wall of a transparent beverage receptacle to form designs thereon for the ornamentation of a beverage introduced into the receptacle comprising, an annular series of members, each member having means for holding thereon a quantity of syrup or paste, means for mounting the members to occupy contracted position and form a relatively small circle, and expanded position to form a relatively large circle, means tending to cause the members to assume the contracted position, and manually operable means for moving the members to the expanded position.

12. A device for applying syrup or pastes to the inner wall of a transparent beverage receptacle to form designs thereon for the ornamentation of a beverage introduced into the receptacle comprising, a body, a plurality of cups mounted on the body and normally tending to occupy a contracted position, and manually operable means on the body for moving the cups to an expanded position.

13. A device for applying syrup or pastes to the inner wall of a transparent beverage receptacle to form designs thereon for the ornamentation of a beverage introduced into the receptacle comprising, a body, a plurality of members mounted on the body to occupy expanded and contracted positions, each member having means to hold a quantity of flavoring syrup or paste thereon and permit discharge therefrom, and means for moving the members to contracted or expanded position.

14. A device for applying syrup or paste to the inner wall of a transparent receptacle to form designs thereon, comprising a body having a plurality of projections capable of carrying syrup or paste, said projections being mounted on the body and adapted to occupy expanded and contracted positions, means tending to move the projections to one of said positions, and means for moving the projections to the other position against the action of the first means, and additional means connected to the body by which the body can be inserted into and withdrawn from the receptacle to cause the projections to deposit syrup or paste thereon in a predetermined manner to form a design in the receptacle.

15. A device for applying syrups or pastes to the inner wall of a transparent beverage receptacle to form designs thereon for the ornamentation of a beverage introduced into the receptacle comprising, a body, and a plurality of elements mounted on the body each tapered substantially to a point at one end and formed to hold a quantity of syrup or paste as to permit it to be discharged from the pointed end when brought into contact with a surface and to thus form a bead of syrup or paste on said surface.

16. A method of ornamenting a beverage glass in the production of an ornamented beverage, which comprises the insertion into the glass of at least one element carrying a quantity of syrup or paste, and then bringing it into contact with the inner-wall of the glass for causing the syrup or paste to be deposited to form a design thereon.

17. A device for applying syrups or pastes to the inner wall of a transparent beverage receptacle to form designs thereon for the ornamentation of a beverage introduced into the receptacle, comprising, a rod, and at least one finger projecting from the rod, said finger having means for holding a quantity of syrup or paste and discharging it only when brought into contact with the wall of the receptacle.

18. A device for applying syrups or pastes to the inner wall of a transparent beverage receptacle to form designs thereon for the ornamentation of a beverage introduced into the receptacle, comprising, a rod flexible fingers projecting from the rod, and means on each finger for holding a quantity of syrup or paste thereon and discharging it only when brought into contact with the wall of the receptacle.

19. A device for applying syrups or pastes to the inner wall of a transparent beverage receptacle to form designs thereon for the ornamentation of a beverage introduced into the receptacle comprising, a body, a plurality of members mounted on and normally tending to occupy a contracted position about the body to define a circle of one diameter, each member having means thereon for holding a quantity of syrup or paste and discharging it only when brought into contact with the wall of a receptacle, and cam means mounted on the body and movable to cause the members to occupy an expanded position in which they define a circle of larger diameter.

PHILIP S. ALLEN.